United States Patent [19]

Chen et al.

[11] Patent Number: 5,148,600
[45] Date of Patent: Sep. 22, 1992

[54] PRECISION MEASURING APPARATUS

[75] Inventors: Yehuda Y. Chen, Irvine, Calif.; Aharon Siev, Haifa, Israel

[73] Assignee: Advanced Robotics (A.R.L.) Ltd., Haifa Bay, Israel

[21] Appl. No.: 761,148

[22] Filed: Sep. 17, 1991

[51] Int. Cl.$^5$ ............................................. G01B 5/00
[52] U.S. Cl. .................................. 33/1 M; 33/503
[58] Field of Search ............... 33/1 M, 503, 706, 707, 33/1 CC, 505

[56] References Cited

U.S. PATENT DOCUMENTS

| | | |
|---|---|---|
| 3,184,600 | 5/1965 | Potter . |
| 3,255,528 | 6/1966 | Brynk . |
| 3,304,612 | 2/1967 | Proctor et al. . |
| 3,678,582 | 7/1972 | Helava . |
| 3,902,182 | 8/1975 | Hillborg . |
| 4,477,726 | 10/1984 | Reichi . |
| 4,479,716 | 10/1984 | Nelle . |
| 4,481,719 | 11/1984 | Grover ................................ 33/707 |
| 4,575,581 | 3/1986 | Langberg ............................ 33/1 M |
| 4,625,410 | 12/1986 | Eder .................................... 33/1 M |
| 4,631,834 | 12/1986 | Hayashi et al. .................... 33/1 M |
| 4,676,649 | 6/1987 | Phillips ............................... 33/1 M |
| 4,758,690 | 7/1988 | Kimura . |
| 4,799,798 | 1/1989 | Erb . |
| 4,908,950 | 3/1990 | Band et al. ......................... 33/1 M |
| 5,092,193 | 3/1992 | Yanagisawa ........................ 33/1 M |

*Primary Examiner*—William A. Cuchlinski, Jr.
*Assistant Examiner*—William C. Dowling
*Attorney, Agent, or Firm*—Benjamin J. Barish

[57] ABSTRACT

Apparatus for precisely measuring the location of points on working media, such as a PCB, includes: a base panel having a surface area at least equal to that of the largest working medium to be measured, a reference mark, and a grid of fiducial marks each located at precisely-known locations with respect to the reference mark; a coarse positioning device movable over the base panel; a fine positioning device carried by and movable over the coarse positioning device; and a holder for holding a working medium substantially in contact with the base panel. The apparatus further includes first measuring means for measuring the location of a preselected point on the coarse positioning device with respect to a preselected fiducial mark of the base panel; and second measuring means carried by the fine positioning device for measuring the location of a point to be measured on the working medium with respect to the preselected point on the coarse positioning device.

20 Claims, 6 Drawing Sheets

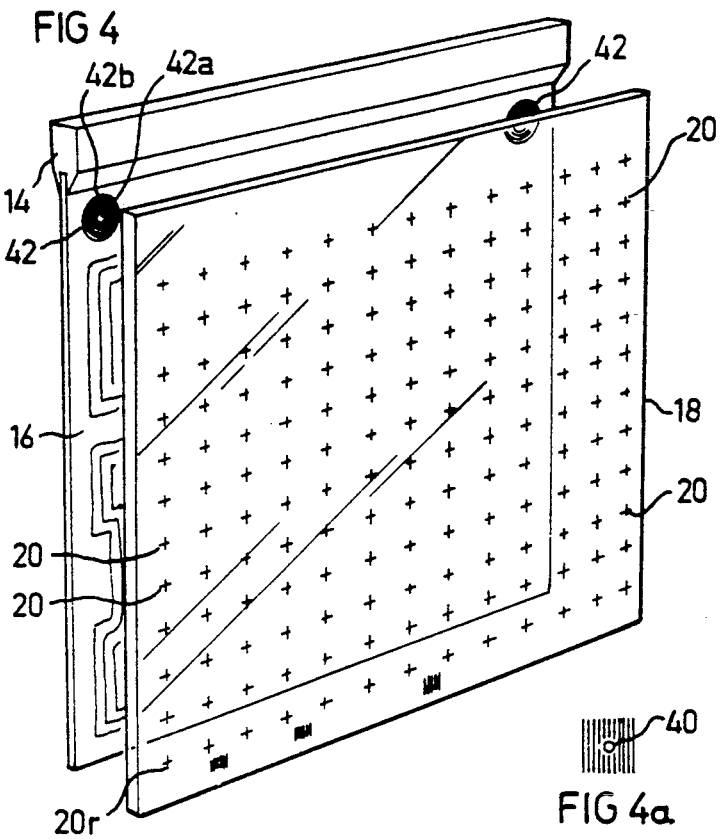
FIG 4
FIG 4a
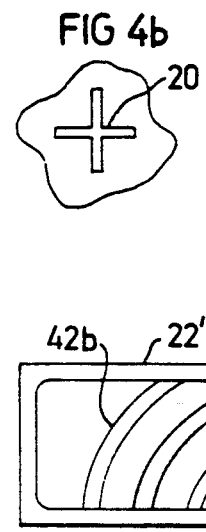
FIG 4b
FIG 4c
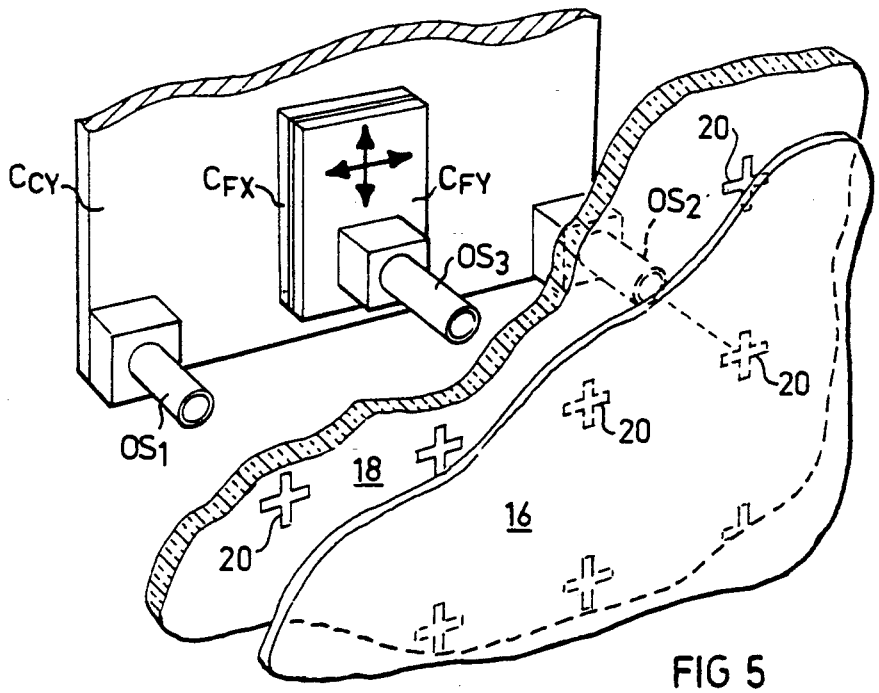
FIG 5

PRECISION MEASURING APPARATUS

FIELD AND BACKGROUND OF THE INVENTION

The invention relates to precision measuring apparatus, and particularly to apparatus for precisely measuring the location of points on working media. The invention is especially useful in the manufacture and/or testing of printed circuit boards (PCBs), and is therefore described below particularly with respect to this application, but it will be appreciated that the invention could advantageously be used in many other applications as well.

PCBs used in the electronics industry are continuously increasing in physical size, feature-density, and number of layers. For example, at the present time PCBs of up to 32"×40", with up to 24 layers, are quite common. The high density of features (e.g., pads, conductors, holes, etc.) on each layer, the large number of layers, and the necessity for precise registration between the layers, require a very high accuracy in each individual layer. Since the production of each layer is based on a series of operations, such as plotting the artwork, developing the films, making contact prints on a laminate, developing, etching, etc., there will be an accumulation of errors in the various operations involved in the production of each layer. Therefore, in order to minimize rejections of a manufactured PCB, very strict quality control must be exercised during each stage of the production to ensure that each layer is maintained within very strict tolerances.

It is a rule of the art that the precision of the measuring apparatus must be at least one order of magnitude higher than the tolerance range required in any specific application. Under this rule, the PCB industry needs a measuring apparatus that can handle areas of a square meter or larger, and determine the coordinates of each point on it with a precision of a few microns.

One way used by the industry for obtaining relatively high precision is to adapt, for this application, the three-coordinate measuring machines which were originally designed for the metal industry. These machines depend for their precision on using a very sturdy, robust and heavy construction in order to maintain a high degree of three-dimension stability in space. Such machines, therefore, generally use granite beams, air bearings, and the like, and weigh more than four tons. Moreover, the machines used in the metal industry generally include mechanical-contact probes. Such probes are not suitable for measuring PCBs and therefore have to be replaced by non-contact probes or sensors, such as optical sensors. The resulting "hybrid" machine is not only extremely expensive and heavy, but is also not especially satisfactory for the PCB industry.

OBJECTS AND BRIEF SUMMARY OF THE INVENTION

An object of the present invention is to provide a new form of apparatus capable of measuring the location of points on a working medium with a high degree of precision even when working with large working media, such as large-size PCBs.

According to the present invention, there is provided apparatus for precisely measuring the location of points on working media, comprising a base panel having a surface area at least equal to that of the largest working medium to be measured, the base panel including a reference mark and a grid of fiducial marks each located at a precisely-known location with respect to the reference mark; a coarse positioning device movable in a plane over the base panel; a fine positioning device having an area smaller than that of the base panel and carried by the coarse positioning device; a holder for holding a working medium in a plane parallel to the base panel; first measuring means for measuring the location of a preselected point on the coarse positioning device with respect to a preselected fiducial mark of the base panel; and second measuring means carried by the fine positioning device for measuring the location of a point to be measured on the working medium with respect to the preselected point on the coarse positioning device.

According to further features in the preferred embodiment of the invention described below, the grid is a rectangular grid of fiducial marks equally spaced along first and second orthogonal axes. In addition, the coarse positioning device comprises a first carriage movable over the base panel along approximately the first orthogonal axis, and a second carriage movable over the first carriage along approximately the second orthogonal axis; and the fine positioning device comprises a third carriage movable over the second carriage along approximately the first orthogonal axis, and a fourth carriage movable over the third carriage approximately along the second orthogonal axis. The first measuring means is carried by the second carriage, and the second measuring means is carried by the fourth carriage.

According to still further features in the described preferred embodiment, the first measuring means comprises an optical sensor carried by the second carriage; a drive for each of the first and second carriages for displacing their respective carriages along their respective orthogonal axes to approximately align the optical sensor of the second carriage with a selected fiducial mark on the base panel; and encoding means for measuring the displacements of the first and second carriage along both the orthogonal axes.

More particularly, in the described preferred embodiment, the first measuring means comprises two optical sensors carried by the second carriage. Also, the second measuring means comprises a third optical sensor carried by the fourth carriage; drives for displacing the third and fourth carriages along their respective axes; and encoding means for measuring the displacements of the third and fourth carriages along their respective axes.

According to still further features in the described preferred embodiment, the two optical sensors are spaced from each other a distance substantially equal to the spacing between, and are aligned with, any two of the fiducial marks on the base panel along the first orthogonal axis. Each of the first and second optical sensors includes a planar matrix of sensing elements. In addition, the first measuring means also includes means for measuring the momentary angle between an axis of the grid of fiducial marks on the base panel, and an imaginary line interconnecting a preselected reference sensing element in each of the two matrices, to thereby provide a measurement of the momentary skew of the second carriage, and of the two optical sensors carried thereby, with respect to the grid of fiducial marks on the base panel.

Particularly good results have been obtained when the first, second and third optical sensors are CCDs (charge coupled devices).

As will be described more particularly below, apparatus constructed in accordance with the foregoing features is capable of providing a high degree of precision (e.g., of a few microns) with relatively large working media, e.g. PCBs of 43"×40". Thus, the size of the workpiece capable of being measured by the apparatus depends on the size of the base panel, which can be as large as desired; and the high accuracy depends to a large extent on the accuracy of the fiducial marks on the base panel, which can also be measured with very high precision, e.g., via Bureau of Standards techniques.

Further features and advantages of the invention will be apparent from the description below.

BRIEF DESCRIPTION OF THE DRAWINGS

The invention is herein described, by way of example only, with reference to the accompanying drawings, wherein:

FIG. 4 is a perspective view illustrating the base panel and the working media holder in the apparatus of FIG. 1, FIGS. 4a, 4b and 4c being enlarged fragmentary views of portions of FIG. 4;

FIG. 5 is an enlarged fragmentary view more particularly illustrating the three optical sensors in the measuring apparatus;

DESCRIPTION OF A PREFERRED EMBODIMENT

Overall Construction

Figure 1:
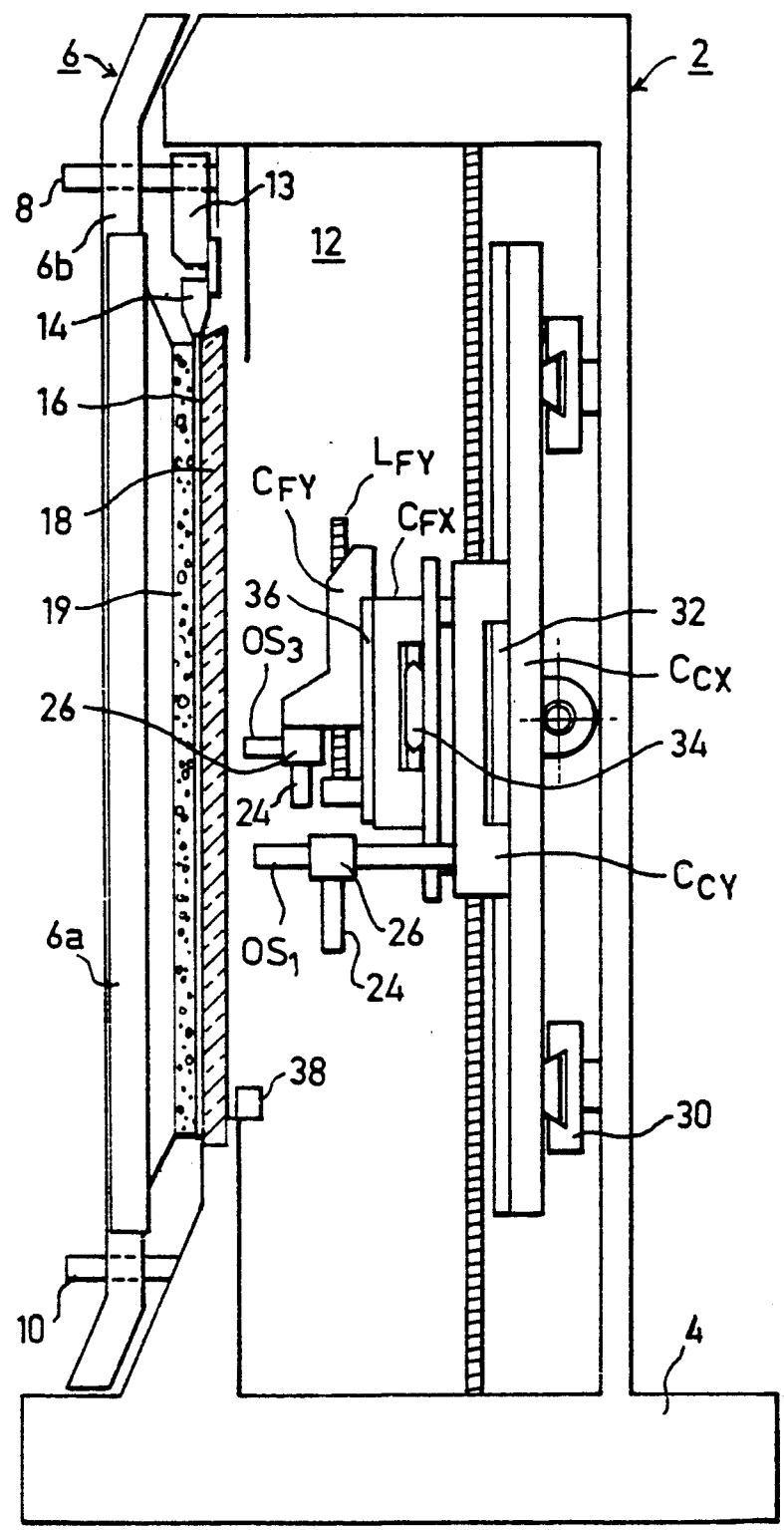
FIG. 1 is a side sectional view illustrating one form of apparatus constructed in accordance with the present invention.
Figure 2:
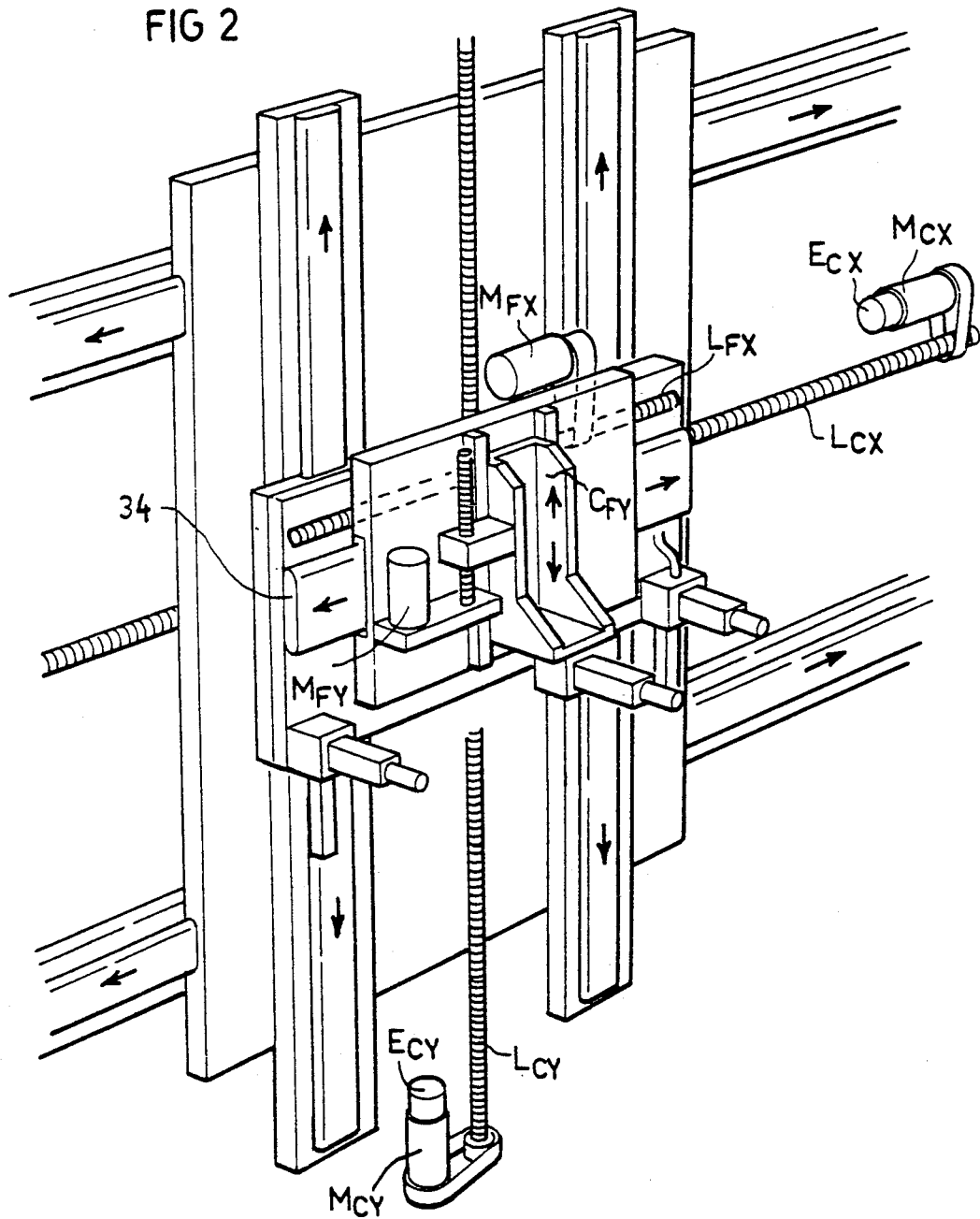
FIG. 2 is a front perspective view of the apparatus of FIG. 1 with the front door and base panel removed to show internal structure.
Figure 3:
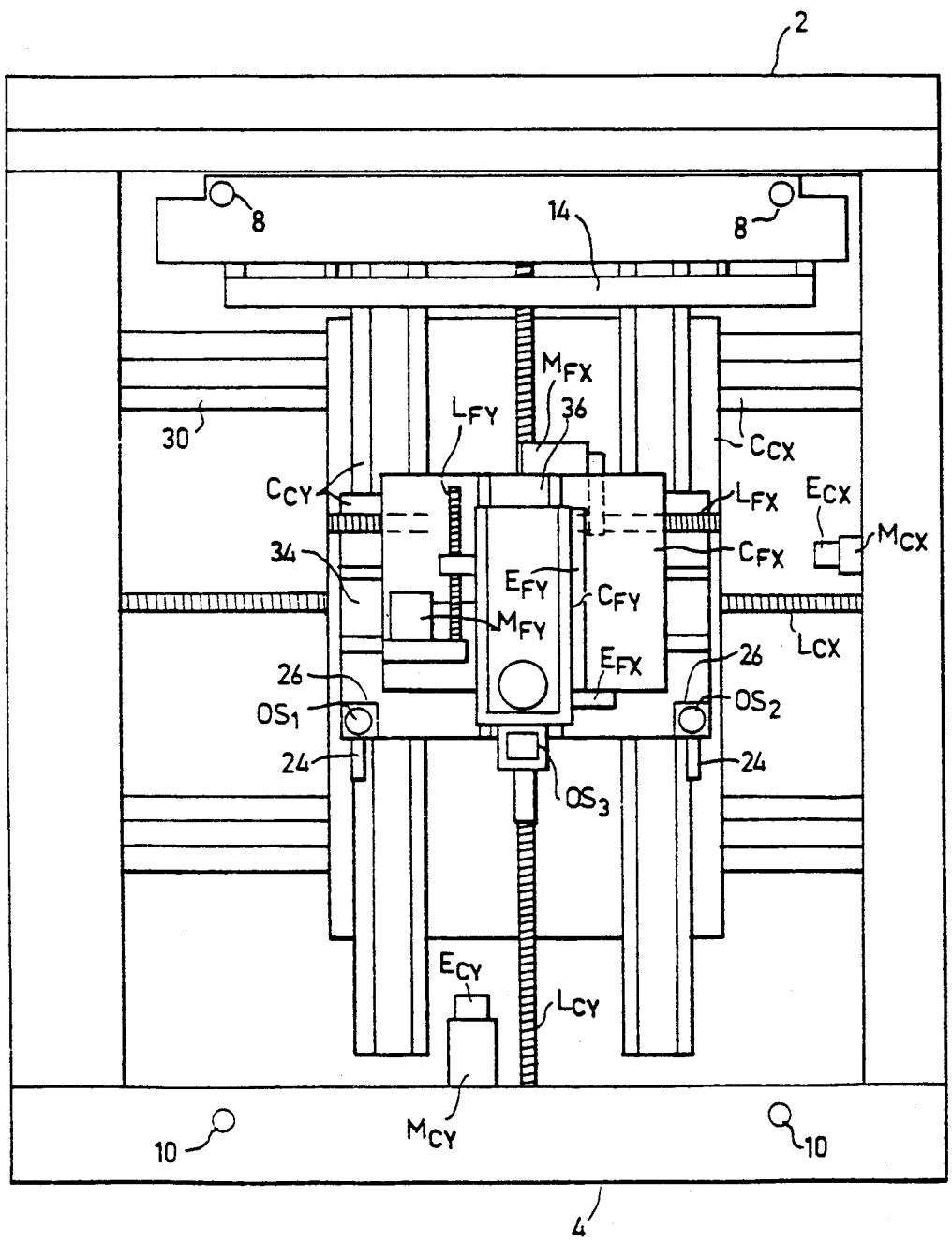
FIG. 3 is a front view of FIG. 2.

The apparatus illustrated in the drawings is particularly useful for locating, with high precision, points on a working medium, such as a PCB (printed circuit board), or artwork, film, or the like used in producing a PCB of relatively large size.

The apparatus comprises a housing, generally designated 2, supported on a base 4. The front end of housing 2 includes a door 6 which is supported by a pair of rods 8 on the opposite sides of its upper end, and a pair of rods 10 on the opposite sides of its lower end, permitting the door to be moved forwardly (leftwardly, FIG. 1) with respect to housing 2. The center section 6a of the door is slidably lateral (perpendicularly to the plane of the paper in FIG. 1) with respect to the door frame 6b.

The housing includes a slide 13 slidable laterally with respect to the housing and supporting a holder 14 for holding a working medium sheet 16 (e.g., a PCB or a film used in making a PCB) immediately behind door 6 when the door is in its closed position. The apparatus further includes a transparent glass panel 18, hereinafter referred to as the base panel, immediately rearwardly of the working medium sheet 16 held by the holder 14. The transparent glass base panel 18 closes the interior of the housing. The working medium sheet 16, while clamped to holder 14, is inserted between the base panel 18 and the door when the door is opened, and is pressed against the base panel when the door is closed. The rear face of door section 6a is covered by a resilient layer 19, such as sponge plastic, which presses the working medium sheet 16 against the base panel 18 when the door 6 is closed.

As shown more particularly in FIG. 4, the transparent base panel 18 is formed with a rectangular grid of cross-shaped fiducial marks 20 (FIG. 4b) equally spaced along both the X-axis and the Y-axis. The Cartesian coordinates of the center of each fiducial mark relative to the center of a reference mark, such as the fiducial mark 20r in the lower lefthand corner, is determined with a high degree of accuracy, e.g., by using Bureau of Standards techniques. Such fiducial marks 20 are applied, e.g., by etching, to the rear face of the transparent base panel 18 so as not to be scratched by the working medium 16.

The Measuring Means

Figure 7:
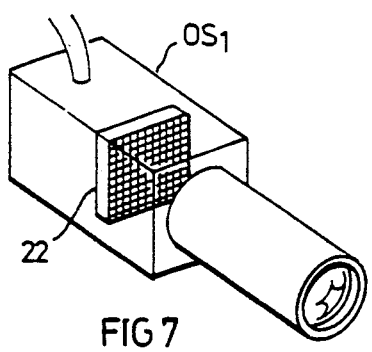
FIGS. 7 and 8 more particularly illustrate the construction of each optical sensor.
Figure 8:
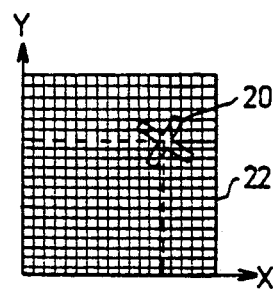

The measuring means within housing 2 includes three optical sensors $OS_1$, $OS_2$ and $OS_3$. Each of the optical sensors is in the form of a CCD (charge couple device) camera having a rectangular, planar matrix of optical sensing elements or pixels, as shown at 22 in FIG. 7. Each camera $OS_1$–$OS_3$ further includes a flashlamp 24 and a housing 26 for housing its electronic circuitry, optical focussing means, and other elements of the respective optical system.

The three cameras $OS_1$–$OS_3$ are carried by a two-stage positioning system, including a coarse two-axes positioning device movable over the working medium sheet 16 and the transparent base panel 18, and a fine two-axes, short-strokes positioning device carried by the coarse positioning device.

More particularly, the coarse positioning device includes a first carriage $C_{CX}$ movable along a track 30 fixed to the inner face of the housing 2 and extending along the X-axis, and a carriage $C_{CY}$ movable along a track 32 fixed to carriage $C_{CX}$ and extending along the Y-axis. The fine positioning device includes a carriage $C_{FX}$ movable along a track 34 carried by carriage $C_{CY}$ and extending a short stroke along the X-axis, and a carriage $C_{FY}$ movable along a track 36 carried by carriage $C_{FX}$ and extending a short stroke along the Y-axis. Cameras $OS_1$ and $OS_2$ are carried at the opposite ends of carriage $C_{CY}$. Camera $OS_3$ is carried by carriage $C_{FY}$.

Individual drives are provided for each of the four carriages. Thus, carriage $C_{CX}$ is driven via a motor $M_{CX}$ and a lead screw $L_{CX}$; carriage $C_{CY}$ is driven by a motor $M_{CY}$ and lead screw $L_{CY}$; carriage $C_{FX}$ is driven by motor $M_{FX}$ and lead screw $L_{FX}$; and carriage $C_{FY}$ is driven by motor $M_{FY}$ and lead screw $L_{FY}$. Each motor in turn includes its own encoder $E_{CX}$, $E_{CY}$, $E_{FX}$, $E_{FY}$. respectively, providing a measurement of the displacement of each carriage by its respective motor. Preferably, the encoders of the fine positioning stage are linear encoders rather than angular encoders.

Figure 6:
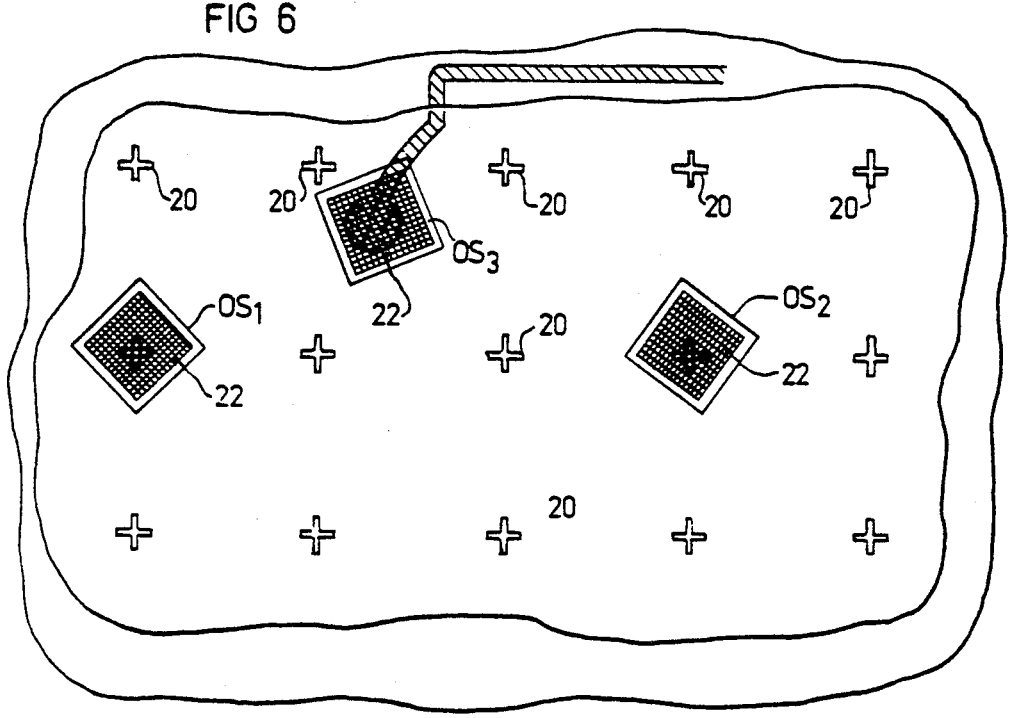
FIG. 6 is a front view of the portion of the apparatus illustrated in FIG. 5.

As will be described more particularly below, the two cameras $OS_1$ and $OS_2$ carried by carriage $C_{CY}$, are called locating cameras, and are spaced apart a distance approximately equal to the spacing between any two of the fiducial marks 20 carried by the glass base plate 18; in the example to be described below, they are spaced approximately equal to the spacing of four such fiducial markings, as shown particularly in FIGS. 5 and 6. The third camera $OS_3$, carried by carriage $C_{FY}$, serves as a measuring camera for precisely measuring the location of the point on the working medium 16 to be measured by the apparatus with respect to the known location of one of the fiducial marks 20.

The three cameras are carried by their respective carriages (carriage $C_{CY}$ for the two locating cameras $OS_1$ and $OS_2$, and carriage $C_{FY}$ for the measuring camera $OS_3$) with the axis of the respective camera substantially perpendicular to the plane of the glass base panel 18. Any deviation of the CCD matrix 22 of the two cameras $OS_1$, $OS_2$ as well as of the measuring camera $OS_3$, with respect to the line CC (FIG. 10) connecting the reference points $RP_1$, $RP_2$, of the two cameras $OS_1$, $OS_2$, is measured by the Moire effect. For this purpose, the base panel 18 includes a plurality of Ronchi grids 40 (FIG. 4a) which are projected on the CCD matrices 22 of the cameras $OS_1$–$OS_3$ producing a Moire effect from which the angular deviation of the matrices can be measured.

As indicated earlier, the two locating cameras $OS_1$, $OS_2$ are focussed on the fiducial marks 20 formed on the inner side of the transparent base panel 18; whereas the measuring camera $OS_3$ is focussable on the inner side and outer side of the transparent base panel.

The interior 12 of housing 2 further includes a thermometer 38 (FIG. 1) preferably a plurality of such thermometers, for measuring the temperature within the housing and particularly adjacent the transparent base panel 18.

Registration of Working Medium

As shown particularly in FIG. 4, each working medium 16 is provided with two widely-spaced reference markings 42 located at known positions relative to the basic coordinate system of the apparatus. The reference markings 42 are used for determining the exact position of the working medium 16 being examined with respect to the base panel 18.

Thus each reference marking 42 includes a solid center 42a surrounded by a number of concentric rings 42b. In the example illustrated, the diameter of the largest ring 42b is about one-half inch. In such an arrangement, the working medium 16 may be clamped to a true position accuracy of one-fourth inch, of a reference point on the clamp, whereupon the rectangular matrix 22 of the sensing elements in the measuring camera $OS_3$, will view at least one of the concentric circles 42b, as schematically indicated at 22' in FIG. 4c. Since the radius of curvature of each concentric circle 42b from its center 42a can be determined, the exact position and angular orientation of the working medium 16 being examined, with respect to the base panel 18, can be determined with a high degree of precision.

OPERATION

Initial Loading and Registration of Working Mediums

In order to load a working medium, such as a sheet 16, into the apparatus, the door 6 is first moved outwardly (leftwardly FIG. 1) on its rods 8, 10, and then the slide 13 is moved laterally of the door frame 6b (out of the plane of the paper in FIG. 1), whereupon holder 14, with the working medium sheet 16 clamped to it, is applied to the slide. The slide 13 is then moved back into alignment with the transparent base panel 18, and the door is then moved rearwardly to cause the resilient layer 19 on the rear face of door section 6a to press the sheet 16 firmly against the transparent base panel 18.

Thus, when the working medium has been loaded into the machine, the reference marks 42 on the working medium are known within an accuracy of one-fourth inch relative to the base panel 18.

On the working medium sheet 16, a line connecting the centers 42a of the two reference marks 42 serves as a reference line, and all locations on the sheet, along both orthogonal axes, can be transformed with respect to this reference line. Accordingly, it is necessary to determine precisely the location of this reference line with respect to the base panel 18, i.e., with respect to the coordinates of the base panel. Such coordinates are hereinafter referred to as the base panel coordinates.

The two locating cameras $OS_1$, $OS_2$ are now moved, by moving the two coarse carriages $C_{CX}$, $C_{CY}$, to locate their respective CCD matrices 22 with respect to the two fiducial marks 20 on the base panel 18 on opposite sides of one of the reference marks 42, so that the measuring camera $OS_3$ matrix will be in alignment with at least a part of the reference mark 42. Since the working medium 16 was clamped to its holder 14 only with a true position accuracy of one-fourth inch, the optical center of the sensor matrix 42 in the measuring camera $OS_3$ will in all probability not be aligned with the solid center 42a of the reference mark 42, but rather will be aligned with some point within one of the outer circles 42b of the reference mark. Since the measuring camera $OS_3$ sees a significant portion of such an outer circle 42b of the reference mark, the radius of curvature of that circle can be determined. The coordinates of the center 42a of this reference mark 42 are thus precisely determined with respect to the transparent base panel 18, i.e., the base panel coordinates.

A similar procedure is then followed for determining the exact coordinates of the center of the second reference marking 42 with respect to the base panel 18.

Having determined the precise coordinates of the centers of the two widely-spaced reference markings 42 on the working medium 16, the medium's coordinate system can be defined relative to that of the transparent base panel 18 (the base panel coordinates). Also, the skew angle of the working medium 16, relative to the base panel coordinates, can be calculated.

Carriages $C_{CX}$, $C_{CY}$ are then displaced to align the two locating cameras $OS_1$, $OS_2$ with respect to two selected fiducial marks 20 on the transparent base panel 18. During this operation, it is only necessary to align the field of view, namely the rectangular matrix 22 of the respective camera, with the respective fiducial mark. In the example illustrated in FIGS. 5 and 6, locating camera $OS_1$ is aligned with one fiducial mark 22, and the other camera $OS_2$ is aligned with the fourth fiducial mark 22 therefrom along the X-axis.

Determining Precise Location of a Feature

In order to find the coordinates of a feature F (FIG. 6) on the working medium 16, the carriages $C_{CX}$ and $C_{CY}$ carrying the two locating cameras $OS_1$, $OS_2$ have to be brought to positions which will enable the locating cameras to "see" one fiducial mark 20 each, i.e., to bring the sensor matrix 22 of the respective camera into alignment with the respective fiducial, as shown in FIG.

6. Carriages $C_{FX}$ and $C_{FY}$, carrying the measuring camera $OS_3$, are then displaced to position the measuring camera $OS_3$ into alignment with the feature F on the working medium 16 whose location is to be determined, i.e., within the field of view of its sensor matrix 22.

As described earlier, the measuring camera $PS_3$ is focussed on the outer side of the transparent base panel 18, whereas the locating cameras $OS_1$, $OS_2$ are focussed on the fiducial marks 22 which are etched on the inner face of the transparent base panel 18.

The true (i.e., theoretical as distinguished from actual) position of feature F is pre-known (from the information down-loaded from the CAD database). During the movement of the two locating cameras $OS_1$, $OS_2$ to their respective fiducial marks, the measuring camera $OS_3$ is moved to this true position of the feature F. When the encoders indicate that all four carriages are at the appropriate positions wherein the two locating cameras $OS_1$, $SO_2$ "see" their respective fiducial marks 20, and the measuring camera "sees" the feature F, the flashlamps 24 for all the cameras are flashed to simultaneously illuminate their fields of view. The information received by the sensor matrix 22 of each camera is read out of the respective camera, and into a computer 50.

Figure 10:
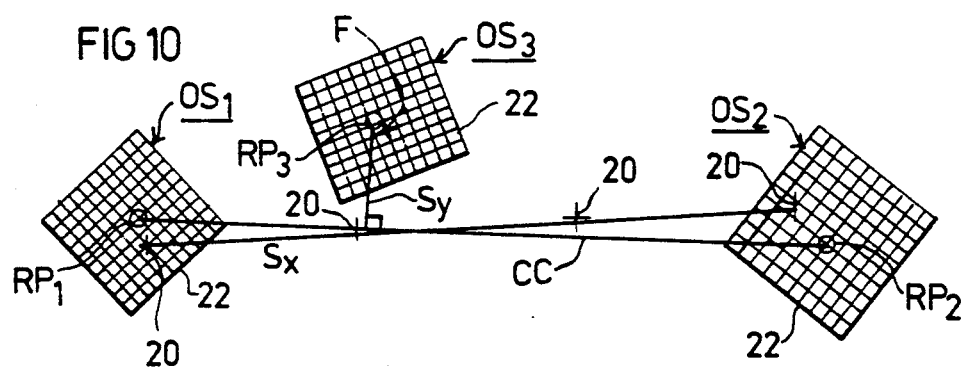
FIGS. 10 and 11 diagrammatically illustrate how the location of any selected point on the working medium is precisely measured.

The information supplied to computer 50 is shown in FIG. 10. Thus, this information includes the offset values of the reference points $RP_1$, $RP_2$, of the two cameras $OS_1$, $OS_2$ relative to the fiducials as they appear on the CCD grid 22; the offset value of the reference point $RP_3$ relative to the feature F as it appears on the CCD grid 22 of camera $OS_3$; the locations of the fiducial marks 20 which were precisely known initially; and also the locations of the reference pixels $RP_1$, $RP_2$ and $RP_3$ of the three cameras, which were initially specified with respect to their CCD grids 22. The information is processed by computer 50 for determining the exact location of the feature F (i.e., $F_{XY}$) in the following manner:

As explained earlier, a certain sensor element in the sensor matrix 22 of each camera $OS_1$, $OS_2$, $OS_3$, is specified as the center of the optical system of the respective camera and is designated as the reference sensor element or pixel. Thus, as shown in FIG. 10, pixel $RP_1$, $RP_2$ and $RP_3$ in cameras $OS_1$, $OS_2$ and $OS_3$, respectively, are designated the center of the optical system of the respective camera. Any pixel in the respective matrix above this pixel will obtain a positive Y-axis value, and any pixel to the right of this pixel will obtain a positive X-axis value.

Figure 11:
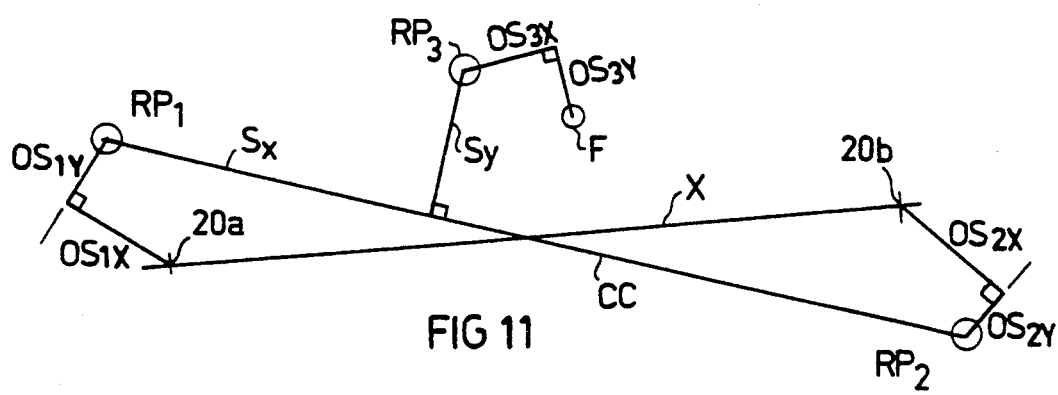

As shown in FIGS. 10 and 11, the momentary X-axis of the transparent base panel 18 is defined by line X passing through the centers of the two fiducial marks 20 on the base panel 18 with which the locating cameras $OS_1$, $OS_2$ are substantially, but not precisely, aligned. Line CC illustrated in FIGS. 10 and 11 is the line connecting the reference pixels $RP_1$, $RP_2$ of the respective camera $OS_1$, $OS_2$, and represents the deviation of the actual location of the two locating cameras $OS_1$, $OS_2$ with respect to the X-axis. Since the locations of the reference pixels $RP_1$, $RP_2$ in the two cameras are previously known, and the locations of the fiducial marks 20 seen by the two cameras can be determined, the skew of the two locating cameras $OS_1$, $OS_2$ from the momentary X-axis can be precisely determined.

Thus, a line X in FIGS. 10 and 11, drawn through the two fiducial marks 20, defines the momentary X-axis of the base panel 18; whereas a line CC drawn through the reference pixels $RP_1$, $RP_2$ of the two locating cameras $OS_1$, $OS_2$, represents the skew of the sensor matrices 22 of the two locating cameras $OS_1$, $OS_2$, with respect to the momentary X-axis of the base panel 18. Similarly, line $S_Y$, substantially perpendicular to line CC, represents the movement of the $C_{FY}$ carriage and line $S_X$ represents the movement of the $C_{FX}$ carriage, both as measured by their respective encoders $E_{FY}$, $E_{FX}$.

We now know, or can determine, the following information: the distance of $RP_1$ from fiducial 20a this distance is known in pixels, but since the magnification and the CCD matrix deviation relative to line CC are known, the distance $RP_1$ can be converted to length units in a coordinate system (in which the line CC is its X-axis); the distance as above of $RP_2$ from fiducial 20b; the distance $S_X$ along the line CC; and the distance F from $RP_3$ (in pixels, transformed to length units as above).

With this information, the exact location of the feature F related to 20a (or 20b) can be determined, as shown in FIGS. 10 and 11. This location is referred to as the base panel coordinates of feature F.

It will thus be seen that the distance between any two points (F) on the working medium 16 can be precisely defined by subtracting their respective base panel coordinates (which are not necessarily parallel to the coordinates of the working medium).

Figure 9:
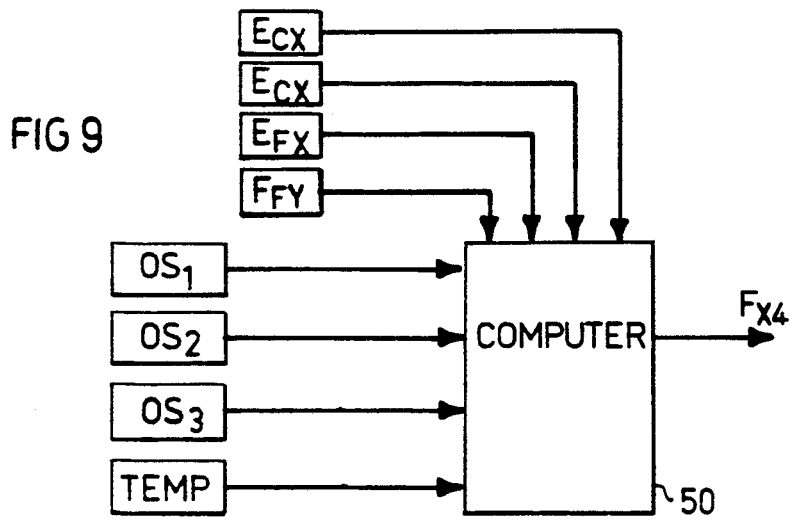
FIG. 9 illustrates the inputs to the computer for precisely measuring the location of any selected point on the working medium.

Another input into computer 50, as shown in FIG. 9, is the information from the thermometer (or thermometers) 38, so that variations in the temperature can also be compensated for.

It will thus be seen that the illustrated apparatus can precisely locate the two-dimensional coordinates of any point on a working medium of any size, limited only by the size of the transparent base panel 18. If the location along the third dimension (Z-axis) is desired, this can be done by mounting the measuring camera $OS_3$ for movement towards and away from the working medium and transparent base panel, in order to focus the camera at different planes in the working medium, and measuring the plane at which the camera is so focussed.

While the invention has been described with respect to one preferred embodiment, it will be appreciated that this is set forth purely for purposes of example, and that many variations, modifications and other applications of the invention may be made.

What is claimed is:

1. Apparatus for precisely measuring the location of points on working media, comprising:

a base panel having a surface area at least equal to that of the largest working medium to be measured, said base panel including a reference mark and a grid of fiducial marks each located at a precisely-known location with respect to said reference mark;

a coarse positioning device movable in a plane over said base panel;

a fine positioning device having an area smaller than that of the base panel and carried by said coarse positioning device;

a holder for holding a working medium in contact with said base panel;

first measuring means for measuring the location of a preselected point on said coarse positioning device with respect to a preselected fiducial mark of the base panel;

and second measuring means carried by said fine positioning device for measuring the location of a point to be measured on the working medium with respect to said preselected point on the coarse positioning device.

2. The apparatus according to claim 1, wherein:
said grid is a rectangular grid of fiducial marks equally spaced along first and second orthogonal axes;
said coarse positioning device comprises a first carriage movable over the base panel along a first orthogonal axis, and a second carriage movable over said first carriage along a second orthogonal axis;
and said fine positioning device comprises a third carriage movable over said second carriage along said first orthogonal axis, and a fourth carriage movable over said third carriage along said second orthogonal axis;
said first measuring means being carried by said second carriage, and said second measuring means being carried by said fourth carriage.

3. The apparatus according to claim 2, wherein said first measuring means comprises:
an optical sensor carried by said second carriage;
a drive for each of said first and second carriages for displacing their respective carriages along their respective orthogonal axes to approximately align said optical sensor of the second carriage with a selected fiducial mark on the base panel;
and encoding means for measuring the displacements of said second carriage along both said orthogonal axes.

4. The apparatus according to claim 3, wherein said first measuring means comprises two optical sensors carried by said first and second carriages over said base panel.

5. The apparatus according to claim 4, wherein said second measuring means comprises:
a third optical sensor carried by said fourth carriage;
a drive for displacing said third and fourth carriages along said smaller area;
and encoders for measuring the displacements of said third and fourth carriages.

6. The apparatus according to claim 5, wherein said two optical sensors are spaced from each other a distance substantially equal to the spacing between, and are aligned with, any four of said fiducial marks on the base panel along said first orthogonal axis.

7. The apparatus according to claim 5, wherein:
each of said first and second optical sensors includes a planar matrix of sensing elements;
and said first measuring means also includes means for measuring the momentary angle between said first orthogonal axis of the fiducial marks on the base panel, and an imaginary line interconnecting a preselected reference sensing element in each of said two matrices, to thereby provide a measurement of the total skew of the coarse positioning device, and of the two optical sensors carried thereby, with respect to said rectangular grid of fiducial marks on the base panel.

8. The apparatus according to claim 7, wherein said third optical sensor also includes a planar matrix of sensing elements having a preselected reference sensing element.

9. The apparatus according to claim 8, wherein said first, second and third optical sensors are CCD's.

10. The apparatus according to claim 9, wherein said apparatus further comprises:

illuminating means for simultaneously illuminating the two fiducial marks on the base panel with which said two optical sensors on the coarse carriage are approximately aligned, and the point on the working medium to be located on which the third optical sensor is approximately aligned;
and individual focussing means for individually focussing each of said optical sensors.

11. The apparatus according to claim 9, wherein said base panel is transparent and includes a plurality of Ronchi grids for providing an indication by the Moire effect, appearing when the Ronchi grids are projected on the CCD grids, of any inclination of the CCD grids of the optical sensors with respect to an imaginary line interconnecting two preselected reference sensing elements.

12. The apparatus according to claim 1, wherein the working medium includes a plurality of concentric rings in order to permit registration of the medium to be measured with the base panel.

13. Apparatus for precisely measuring the location of points on working media, comprising:
a base panel having a surface area at least equal to that of the largest working medium to be measured, said base panel including a reference mark and a grid of fiducial marks each located at a precisely-known location with respect to said reference mark;
a coarse positioning device movable over said base panel;
a fine positioning device carried by and movable over said coarse positioning device;
a holder for holding a working medium in contact with said base panel;
first measuring means including a planar matrix of optical sensor elements for measuring the location of a preselected point on said coarse positioning device with respect to a preselected fiducial mark of the base panel and its inclination to said grid of fiducial marks;
and second measuring means carried by said fine positioning device including a planar matrix of optical sensor elements for measuring the location of a point to be measured on the working medium with respect to said preselected point on the coarse positioning device.

14. The apparatus according to claim 13, wherein:
said grid is a rectangular grid of fiducial marks equally spaced along first and second orthogonal axes;
said coarse positioning device comprises a first carriage movable over the base panel along said first orthogonal axis, and a second carriage movable over said first carriage along a second orthogonal axis;
and said fine positioning device comprises a third carriage movable over said second carriage along said first orthogonal axis, and a fourth carriage movable over said third carriage along said second orthogonal axis;
said planar grid of optical sensor elements of said first measuring means being carried by said second carriage, and said planar grid of optical sensor elements of said second measuring means being carried by said fourth carriage.

15. The apparatus according to claim 14, wherein said first measuring means further includes:

a drive for each of said first and second carriages for displacing their respective carriages along their respective orthogonal axes to approximately align said planar grid of optical sensor elements of the second carriage with a selected fiducial mark on the base panel;

and encoding means for measuring the displacements of said second carriage along both said orthogonal axes.

16. The apparatus according to claim 15, wherein said first measuring means comprises two planar grids of optical sensor elements carried by said first and second carriages over said base panel; and said second measuring means comprises: drives for displacing said third and fourth carriages; and encoding means for measuring the displacements of said third and fourth carriages.

17. The apparatus according to claim 16, wherein said two optical sensors are spaced from each other a distance substantially equal to the spacing between, and are aligned with, any two of said fiducial marks on the base panel.

18. The apparatus according to claim 16, wherein said first measuring means also includes means for measuring the momentary angle between said first orthogonal axis of the fiducial marks on the base panel, and an imaginary line interconnecting a preselected reference sensing element in each of the two matrices of said first measuring means, to thereby provide a measurement of the skew of the second carriage, and of the two optical sensors carried thereby, with respect to said rectangular grid of fiducial marks on the base panel.

19. The apparatus according to claim 13, wherein said base panel is transparent and includes a plurality of Ronchi grids for providing an indication by the Moire effect, appearing when the Ronchi grids are projected on the CCD grids, of any inclination of the CCD grids of the optical sensors with respect to an imaginary line interconnecting two preselected reference sensing elements.

20. The apparatus according to claim 13, wherein the working medium includes a plurality of opaque concentric rings in order to permit registration of said second measuring means with respect to the working medium.

* * * * *